(12) United States Patent
Paielli et al.

(10) Patent No.: US 11,767,893 B2
(45) Date of Patent: Sep. 26, 2023

(54) SYSTEMS AND METHODS FOR DRIVELINE CONTROL

(71) Applicant: Dana Automotive Systems Group, LLC, Maumee, OH (US)

(72) Inventors: Perry M. Paielli, Sand Creek, MI (US); Justin S. Davis, Maumee, OH (US); Terry W. McGraner, Toledo, OH (US); Sagar B. Bangar, Ypsilanti, MI (US); Michael Z. Creech, Ann Arbor, MI (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 17/457,192

(22) Filed: Dec. 1, 2021

(65) Prior Publication Data

US 2023/0167861 A1    Jun. 1, 2023

(51) Int. Cl.
*F16D 48/06*    (2006.01)

(52) U.S. Cl.
CPC .......... *F16D 48/06* (2013.01); *F16D 2300/18* (2013.01); *F16D 2500/30408* (2013.01); *F16D 2500/5012* (2013.01); *F16D 2500/5112* (2013.01); *F16D 2500/7041* (2013.01); *F16D 2500/7109* (2013.01)

(58) Field of Classification Search
CPC ..... F16D 2500/5012; F16D 2500/5112; F16D 48/06; F16D 2300/18; F16D 2300/5012; F16D 2300/5112; F16D 2300/7041; F16D 2300/7109; G01M 13/022

See application file for complete search history.

(56) References Cited

U.S. PATENT DOCUMENTS

| | | | |
|---|---|---|---|
| 8,538,648 B2 | 9/2013 | Schindler et al. | |
| 9,915,303 B1 | 3/2018 | Parada Centeno et al. | |
| 10,711,849 B2 * | 7/2020 | Inose | F16H 48/32 |
| 2003/0019711 A1 * | 1/2003 | Nekado | F16D 27/115 |
| | | | 192/84.1 |
| 2016/0231198 A1 * | 8/2016 | Kaess | F16D 11/14 |
| 2017/0227422 A1 * | 8/2017 | Cheng | G01D 5/12 |
| 2020/0292356 A1 * | 9/2020 | McGraner | F16H 48/34 |

FOREIGN PATENT DOCUMENTS

| | | | | |
|---|---|---|---|---|
| DE | 102015221533 A1 | | 5/2016 | |
| EP | 2128456 A2 | * | 12/2009 | .......... F15B 15/2807 |
| WO | WO-2017153027 A1 | * | 9/2017 | .......... F16D 25/083 |

* cited by examiner

*Primary Examiner* — Timothy Hannon
(74) *Attorney, Agent, or Firm* — McCoy Russell LLP

(57) ABSTRACT

Methods and systems are provided for sensing a clutch position. In one example, a method may include generating a single output signal by combining at least an output of a first sensor and an output of a second sensor output, the first sensor and second sensor connected in parallel, and the first sensor and the second sensor sensing a common moving element of a clutch. In one example, the method may further include a first sensor output and a second sensor output provided on a common sensor bus. As another example, the first sensor output may be a master pulse width modulation output, and the second sensor output follows a modulation frequency of the first sensor output.

16 Claims, 5 Drawing Sheets

SYSTEMS AND METHODS FOR DRIVELINE CONTROL

TECHNICAL FIELD

The present description relates generally to methods and systems for control of a clutch system of a transmission.

BACKGROUND AND SUMMARY

Vehicle drivelines may include control mechanisms to ensure the engagement and release integrity of a clutch. Some driveline connection control systems rely on sensors to provide feedback of the state of the driveline, e.g., connection, disconnection. These control systems manage the transmission of rotational energy from a power source (e.g., internal combustion engine, electric motor) to one or more output shafts using an actuator. The actuator typically relies on a clutch that is electrically controlled to bring the power input into physical contact with the output to allow rotational energy to be conducted between both. Vehicle driveline control mechanisms may be implemented for a variety of reasons including safety, diagnostics, engagement, and smoothness.

Attempts to provide information about a connection of a transmission input shaft and an output shaft, e.g., clutch gear teeth or plates physical contact separating distance, include the use of a sensor to provide feedback to the control strategy. However, the inventors have recognized drawbacks with such strategies. As one example, a sensor may indicate a position of a clutch but may lack redundancy to perform plausibility checks. As another example, a sensor may provide clutch release and engagement feedback, but may not detect transitional engagement. As further example, transitional engagement over a range of intermediate positions may be difficult to detect, especially in a manner that is tolerant to variations in engagement, as may be the case in examples where one or more components of the clutch are degraded.

The inventors have recognized the aforementioned issues and developed a multi-sensor method for sensing a clutch position. In one example, the method includes generating a single output signal by combining at least an output of a first sensor and an output of a second sensor. The multi-sensor method includes the first sensor and second sensor connected in parallel. The method further includes the first sensor and the second sensor sensing a common moving element of the clutch. In this way, a multi-sensor method for sensing a clutch position provides clutch release and engagement integrity.

In another example, the multi-sensor method for sensing a clutch position may further include the first sensor output and the second sensor output provided on a common sensor bus. In such an example, the first sensor output may be a master pulse width modulation output, and the second sensor output may follow the modulation frequency of the first sensor output. In one example, the first sensor may output a low to high transition at the modulation frequency, and the second sensor may add its output at the modulation frequency. As an example, the first sensor may output a longer pulse in response to detection of internal degradation of the first sensor, a shorter pulse in response to the position being below a minimum threshold, and a medium pulse in response to the position being above the minimum threshold. In such an example, in response to the second sensor detecting the low to high transition of the first sensor, the second sensor may sample the output of the first sensor and generate an output based on measuring the position of the clutch. In this way, a multi-sensor method enables fault detection and position estimation over a range of engagement positions, including intermediate positions typical of transitional engagement.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
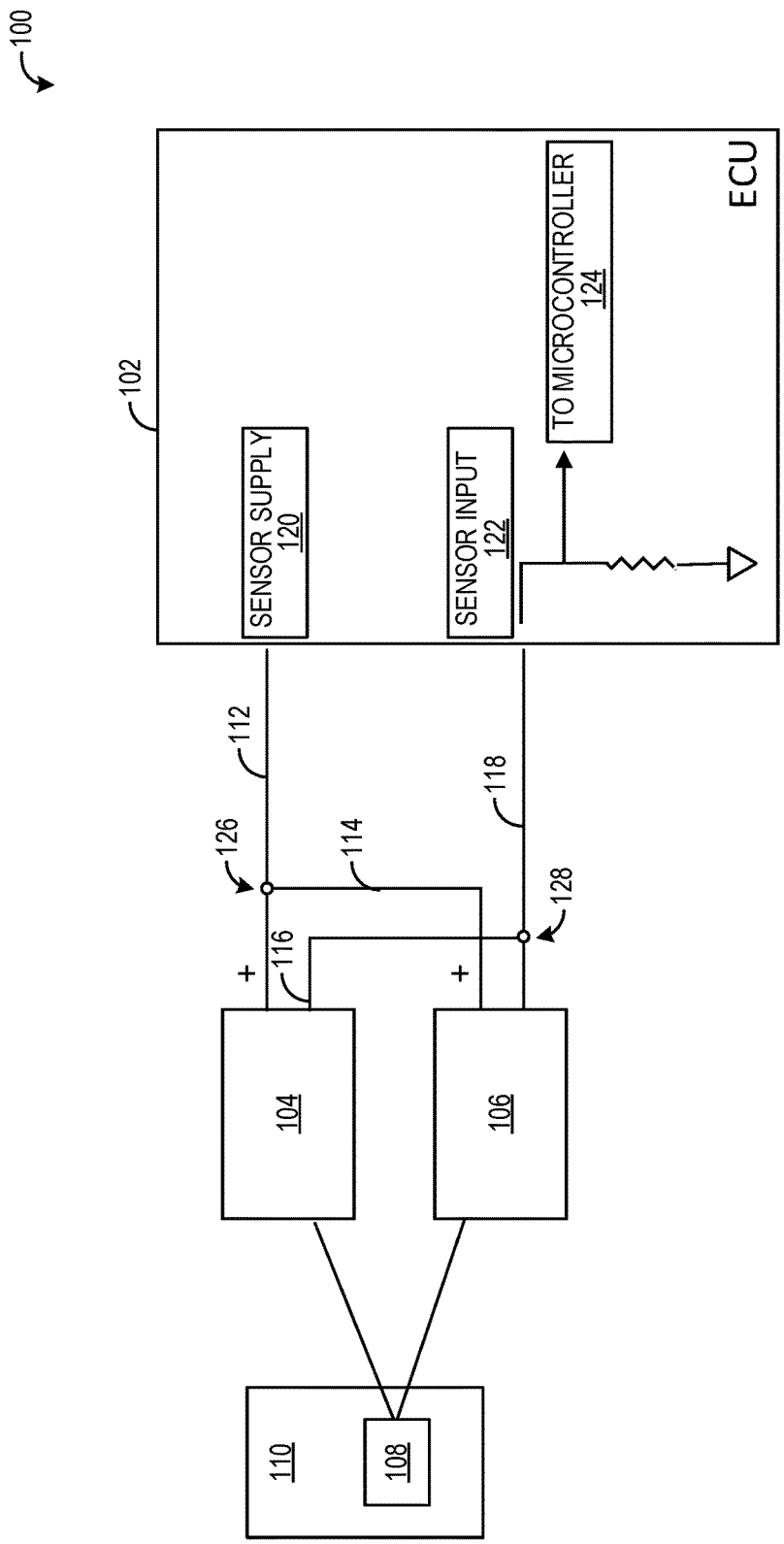
FIG. 1 shows a schematic diagram of an example sensor array with a first sensor and a second sensor wired in parallel for detecting a position of a clutch of a transmission system.
Figure 2:
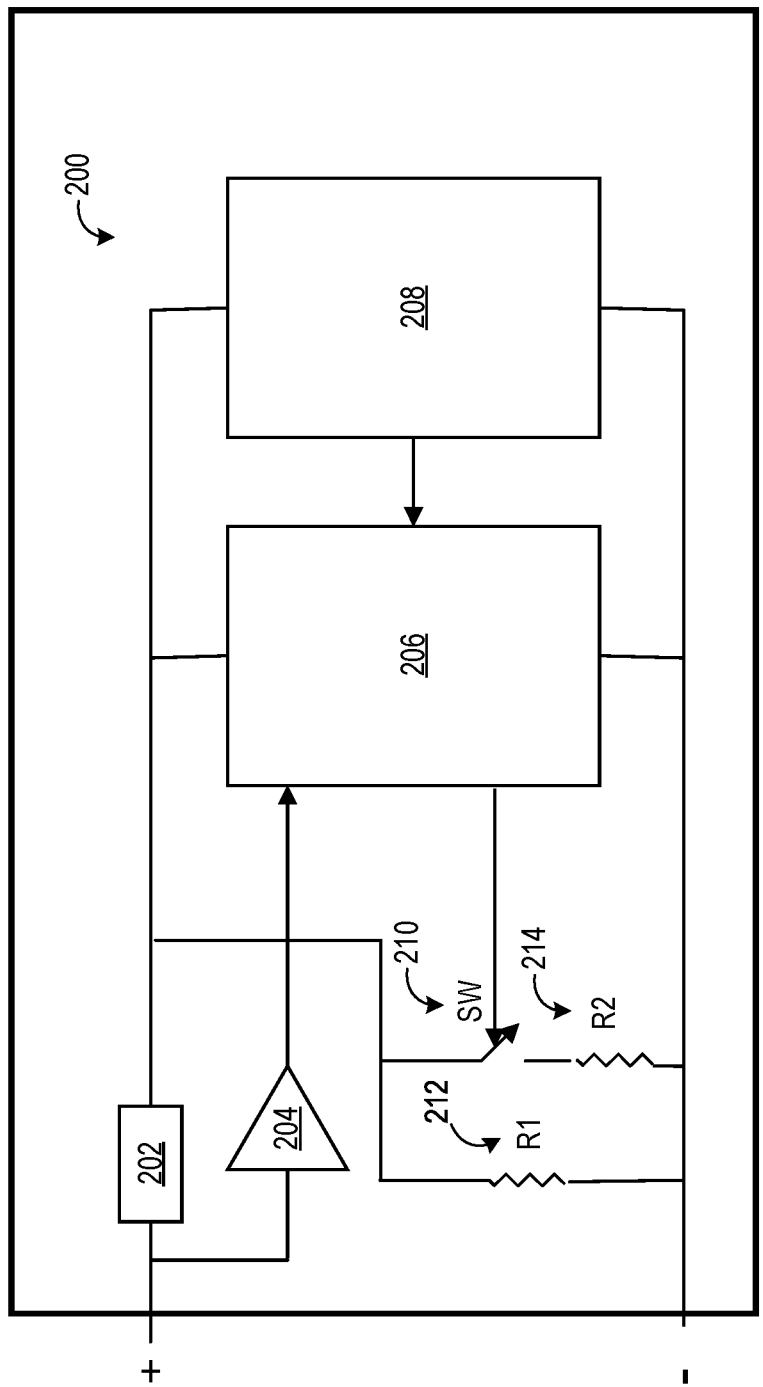
FIG. 2 shows a schematic diagram of an electronic circuit for a pulse width modulated (PWM) signal sensor of a sensor array, such as that of FIG. 1.
Figure 3:
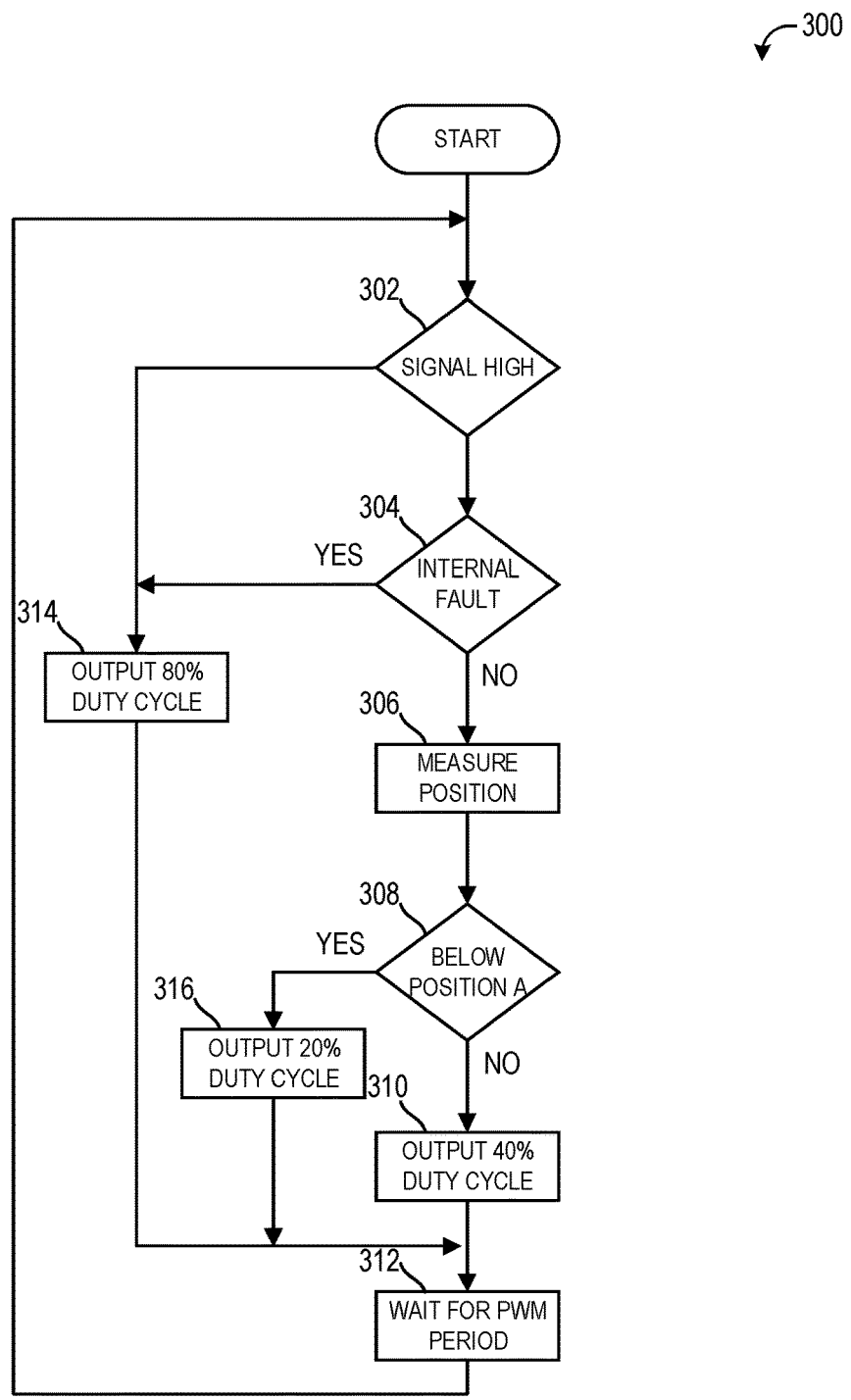
FIG. 3 shows a method for a logic for a first sensor connected in a sensor array, such as that of FIGS. 1-2.
Figure 4:
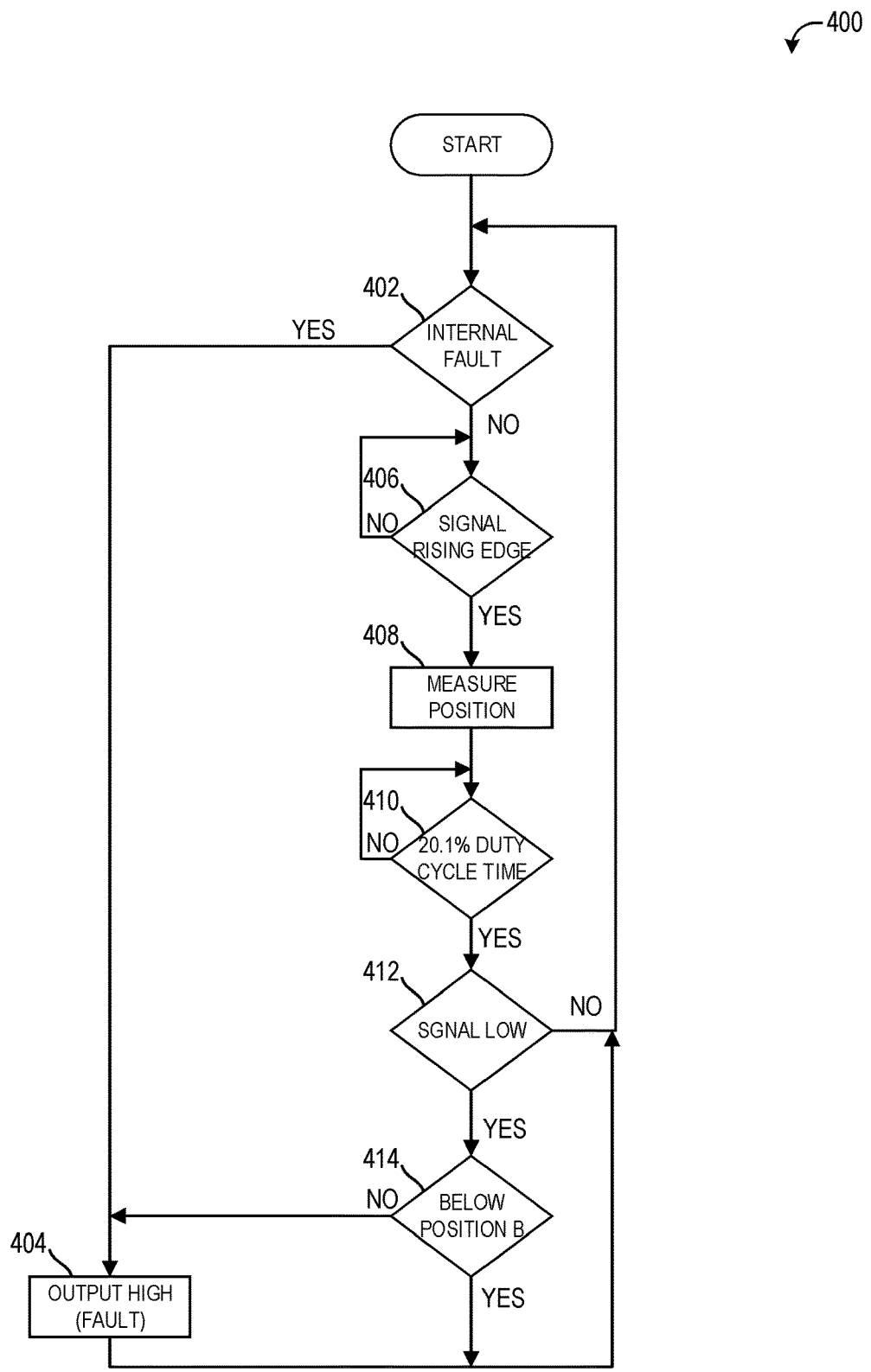
FIG. 4 shows a method for a logic for a second sensor connected in a sensor array, such as that of FIGS. 1-2.

The following description relates to systems and methods sensing a clutch position. In one example, the system may include two or more position sensors wired in parallel to control the engagement and release integrity of a clutch. The two or more position sensors function in a sensor network to provide a single output signal of a common moving element to a control unit. In one example, the single output signal of the sensor array is the sum of the sensor position signals for the plurality of sensors. A multi-sensor array 100 depicting an example two-sensor system is shown in FIG. 1. The output current of the sensor array may be static or pulse width modulated (PWM). Static current outputs of the example two-sensor system are described in tables 1 through 3. FIG. 2 shows a block diagram of an example electronic circuit 200 for a PWM signal sensor in a sensor array, such as the two-sensor array illustrated in FIG. 1. PWM outputs of the example two-sensor system are described in tables 4 through 6. FIG. 3 shows a method 300 for a first sensor log, e.g., a master logic, for the example two-sensor array. FIG. 4 shows a method 400 for a second sensor logic, e.g., slave logic, for the example two-sensor array. A timing diagram 500 shows three cycles of pulse width modulation for a range of clutch positions detected by an example sensor array according to the method of FIG. 3 and FIG. 4.

FIG. 1 shows a block diagram of an embodiment of a multi-sensor array 100. The multi-sensor array 100 is connected in a clutch system that uses an Electronic Control Unit (ECU) 102. In one example, a first sensor 104 and a second sensor 106 may detect the position of a clutch 108 of a manual transmission 110. In one example, the clutch 108 may be a dry friction clutch of a clutch system that selectively couples an engine crankshaft to the input shaft (not shown) of the manual transmission 110. In another example, the clutch 108 may be a dog type clutch. In another example, the clutch 108 may be a wet clutch. In another example, the multi-sensor array 100 may detect a clutch position of a differential. The first sensor 104 and the second sensor 106 detect the position of the clutch 108 based on the position of a common moving element of the clutch. In one example, the common moving element may be one or more teeth of a gear of the clutch. In another example, the common moving element may be one or more plates of the gear of the clutch. In one example, a single output signal may be generated by combining at least an output of the first sensor and an output of the second sensor. In one embodiment, the output of each sensor may be a static signal. In another example, the output of each sensor may be a PWM signal.

Electrical current is supplied from a sensor supply 120 of the ECU 102 to the first sensor 104 via a first supply wire 112. A second supply wire 114 is electrically coupled to the first supply wire 112 at intersection 126. Electrical current is supplied to the second sensor 106 from the sensor supply 120 via the second supply wire 114. The first sensor 104 transmits a current based on the position of the movable element via first input wire 116. The first input wire 116 is electronically coupled to a second input wire 118 at intersection 128. The second sensor 106 transmits a current based on the position of the moveable element via the second input wire 118. In an example, the output of the multi-sensor array 100 is the sum of the position signals of the first sensor 104 and the second sensor 106. In an example, the sum of the position signals is transmitted as a sensor input 122 to microcontroller 124. In an example, the microcontroller 124 determines degradation of the clutch in response to sensor input 122 and generates an indication of the determined degradation. In one example, the microcontroller may generate diagnostic signals based on the combined sensor output. In an example, the microcontroller controls vehicle operation, such as clutch enablement operations of clutch 108 of the transmission.

In an example, the static signal each sensor conducts may be an amount of current that is proportional to the position of the common moving element. Example Tables 1 through 3 are shown below illustrating a level of current through a sensor for the position of the moving element, e.g., clutch gear teeth. In the tables, a first column is shown indicating the position of the moving element and a second column shows the current, e.g., sensor output, at the position. In the example, the current levels allow for fault detection because none of the possible summed values equals any of the single sensor levels. Table 1 shows an example first output, where clutch gear teeth at a distance of 1 millimeter (mm) or less distance will produce 4.0 ma current and clutch gear teeth at a distance greater than 1.0 mm will produce a 6.0 milliampere (ma) current. Table 2 shows an example second output, where clutch gear teeth at a distance of 2.0 mm or less will produce a 8.0 ma current and clutch gear teeth at a distance greater than 2.0 mm will produce a 10.0 ma current. Table 3 shows an example combined first output and second output. Clutch gear teeth at a distance of 1.0 mm or less will produce a 12.0 ma current and clutch gear teeth at a distance greater than 1.0 mm will produce a 14.0 ma current. Clutch gear teeth at a distance of 2.0 mm or less will produce a 14.0 ma current and clutch gear teeth at a distance greater than 2.0 mm will produce a 16.0 ma current.

TABLE 1

| Position of Moving Element (mm) | Current Through Sensor (ma) |
|---|---|
| ≤1.0 | 4.0 |
| >1.0 | 6.0 |

TABLE 2

| Position of Moving Element (mm) | Current Through Sensor (ma) |
|---|---|
| ≤2.0 | 8.0 |
| >2.0 | 10.0 |

TABLE 3

| Position of Moving Element (mm) | Current Through Sensor (ma) |
|---|---|
| ≤1.0 | 12.0 |
| >1.0 | 14.0 |
| ≤2.0 | 14.0 |
| >2.0 | 16.0 |

FIG. 2 shows a block diagram illustrating an embodiment of an electronic circuit 200 for a PWM signal sensor in a multi-sensor array, such as the multi-sensor array 100 of FIG. 1. In one example, the microcontroller 206 controls a switch 210 to produce a current flow established by a first resistor 212 and second resistor 214 based on a position sensed by sensing element 208, such as first sensor 104 of FIG. 1. In one example, the first sensor 104 may be a master sensor. In the electronic circuit 200, operational amplifier 204 may detect the pulses of the one or more sensors parallel connected in the array, e.g., the second sensor 106 of FIG. 1. Voltage regulator 202 is included in the electronic circuit 200. In one example, the sensing element 208 may provide two different current levels where each would be one of two logic states. In an example, with switch 210 open, the first resistor 212 determines the current (ignoring circuit current draw contribution) of a low state. In another example, with switch 210 closed, the first resistor 212 in parallel with second resistor 214 determines the current (ignoring circuit current draw contribution) of a high state. In one example, the duty cycle of the PWM would be defined as a high state current duration divided by a fixed time interval. In one example, the fixed time interval is 1/frequency of the PWM.

In one example, a single pulse-width modulated output signal may be generated by combining at least a pulse width modulated output of the first sensor and the second sensor. In one example, the first sensor output and the second sensor output may be provided on a common sensor bus. In one example, the first sensor output may be a master pulse width modulation output. The one or more second sensors connected in parallel may follow the modulation frequency of the first sensor output such that the first sensor may provide the PWM cycle start. The one or more second sensors on the parallel sensor bus may synchronize on every rising edge of the master pulse width modulation output. Example Tables 4 through 6 are shown illustrating a level of a single output signal, e.g., modulation frequency, of a sensor bus indicating the position of the moving element, e.g., clutch gear teeth. In Tables 4 through 6, a first column is shown indicating a threshold position of the moving element and a second column shows the current at the position as a percent duty cycle. An example first sensor PWM output in a sensor array is shown in table 4. In the example table, clutch gear teeth at a position greater than a minimum threshold, e.g., 1.0 mm, or more may produce a first sensor output at 40% duty cycle. Clutch gear teeth position less than the minimum threshold may produce first sensor output at 20% duty cycle. An example second sensor PWM output is shown in table 5. The second sensor waits until the 40% PWM point of the output of the first sensor before deciding what its output should be. In the example table, clutch gear teeth position equal to or less than a second threshold, e.g., 2.0 mm, may produce no additional second sensor output. Clutch gear teeth position greater than the second threshold may produce a second sensor output at 20% duty cycle. An example combined first and second sensor PWM output is shown in Table 6. In the example table, clutch gear teeth position equal to or less than the minimum threshold, e.g., 1.0 mm, may produce a combined output at 20% duty cycle. Clutch gear teeth at a position greater than the minimum threshold and less than or equal to the second threshold may produce a combined output at 40% duty cycle. Clutch gear teeth position greater than the second threshold may produce a combined output at 60% duty cycle.

TABLE 4

| Position of Moving Element (mm) | Current Through Sensor (% Duty Cycle) |
|---|---|
| ≤1.0 | 20 |
| >1.0 | 40 |

TABLE 5

| Position of Moving Element (mm) | Current Through Sensor (% Duty Cycle) |
|---|---|
| ≤2.0 | 0 |
| >2.0 | +20.0 |

TABLE 6

| Position of Moving Element (mm) | Current Through Sensor (% Duty Cycle) |
|---|---|
| ≤1.0 | 20 |
| >1.0 | 40 |
| ≤2.0 | 40 |
| >2.0 | 60 |

Turning now to FIG. 3, a method 300 illustrating a logic for a first sensor, e.g., a master logic, is shown. In one example, the master logic provides synchronization of a plurality of sensors by outputting a logic low to high transition at a PWM frequency. If the first sensor, e.g., the master sensor, detects a fault in an internal circuit, a longer pulse is determined. If the first sensor does not detect a fault in the internal circuit, the position of the moveable element may be measured and the pulse period determined based on the position the moveable element. Instructions for carrying out the method 300 and the rest of the methods included herein may be executed by a controller based on instructions stored on a memory of the controller and in conjunction with signals received from sensors of the system, such as the controller, e.g., microcontroller 206, and sensors, e.g., first sensor 104 and second sensor 106, described above with reference to FIG. 1 and FIG. 2. The controller may employ actuators of the manual transmission system to adjust the manual transmission operation, according to the methods described below.

At 302, the method 300 includes determining whether a logic high signal is produced by the first sensor. If a logic high signal is produced by the first sensor, the method 300 continues to 314. At 314, the method 300 determines a longer pulse output, e.g., 80% duty cycle. From 314, the method 300 continues to 312. At 312, the method 300 includes waiting for a PWM period. From 312, the method 300 returns to the start.

Returning to 302, if a logic high signal is not produced by the first sensor, the method 300 continues to 304. At 304, the method 300 includes determining whether there is an internal fault in the circuit of the first sensor. In one example, an internal fault may result from internal degradation affecting one or more components of the system. If no internal fault is determined, the method 300 continues to 306.

At 306, the method 300 includes measuring the position of the moveable element, e.g., the clutch gear teeth. At 308, the method 300 includes comparing the position of the clutch gear teeth to a minimum threshold position. In one example, the minimum threshold position may be a preset non-zero positive value. In one example, the minimum threshold position may be 1.0 mm. If the first sensor measures a position less than the minimum threshold, the method 300 continues to 316. At 316, the method 300 determines a shorter pulse output, e.g., 20% duty cycle. From 316, the method continues to 312 to wait for the PWM period, where the method 300 returns to the start.

Returning to 308, if the sensor detects a position greater than the minimum threshold, the method 300 continues to 310. At 310, the method 300 determines a medium pulse output, e.g., 40% duty cycle. From 310, the method continues to 312 to wait for the PWM period.

Returning to 304, if an internal fault is detected in the circuit of the first sensor, the method continues to 314. At 314, the method determines a long pulse output, e.g., 80% duty cycle. From 314 the method continues to 312 to wait for the PWM period and return to start.

Turning now to FIG. 4, a method 400 is shown illustrating an example logic for a second sensor, such as the second sensor 106 of FIG. 1. In an example, the method 400 may represent a slave logic. In one example, the second sensor output follows the modulation frequency of the first sensor output, sampling from the first sensor output to detect a low to high transition. Following detection, the second sensor samples the signal from the first sensor to determine its contribution to the period of the PWM pulse. In an example, the second sensor may be adding its output at the modulation frequency. The method 400 synchronizes the second sensor to the master pulse width modulation of the first sensor described in the method 300. In this way, a range of clutch positions may be determined in a manner that is fault sensitive and tolerant of variation.

At 402, the method 400 includes determining whether there is an internal fault in the circuit of the second sensor. In one example, an internal fault may result from an internal degradation of the second sensor. If an internal fault is determined, the method continues to 404. At 404, the method 400 determines a logic high output. In one example, the logic high output stops the PWM cycle for the first and the second sensor, allowing the electronic control unit, e.g., ECU 102, to detect a static condition (e.g., a fault signal). Following the fault signal, the method 400 returns to start. If an internal fault is not determined, the method continues to 406.

At 406, the method includes the second sensor determining whether a signal rising edge from the first sensor is detected. In one example, the signal rising edge is a low to high transition in the modulation frequency. In one example, the second sensor uses the rising edge (e.g., the low to high transition) of the first sensor as a reference point in time from which to sample the output signal of the first sensor. Upon detection of a signal rising edge, the method continues to 408.

At 408, the method includes the second sensor measuring the position of the moveable element, e.g., clutch gear teeth. At 410, the method includes determining whether the clutch gear teeth position is equal to or greater than a second threshold. In one example, the second threshold is preset non-zero positive value. In one example, the second threshold is 2.0 mm. At 410, the second sensor continuously samples the signal output of the first sensor until the second sensor detects the clutch gear teeth position greater than the second threshold. Following detection at 410, from the method continues to 412.

At 412, the method 400 includes comparing the second sensor position to the position indicated by the pulse of the first sensor. If the signal is low, the method 400 continues to the method continues to 414. At 414, the method includes determining whether the second sensor detects the position of the moveable element less than the second threshold. As an example, the first sensor pulse is short, indicating less than the minimum threshold, e.g., 1.0 mm, and the 2nd sensor measures that the position is greater than the second threshold position, e.g., 2.0 mm. In this example, there is a disagreement between the first sensor and second sensor measurements. The method continues to 404. At 404, the second sensor once again sets the output to logic high, e.g., a fault signal.

Returning to 414, if the second sensor detects a medium pulse from the first sensor, indicating a position of the moveable element greater than the minimum threshold, and the second sensor measures that the position is less than the second threshold, no action may be taken. The PWM duty from the first sensor cycle indicates a position between first and second threshold. In this case, the first sensor and the second sensor agree.

Returning to 410, if the signal sample from the first sensor is more than the minimum threshold, e.g., 1 mm, and the second sensor measurement is more than the second threshold, e.g., 2 mm, the method 400 returns to start of the logic. As an example, if the second sensor detects a medium pulse from the first sensor, indicating a position greater than the minimum threshold and the second sensor internally measures that the position is greater than the second threshold, the second sensor may output a low duty cycle addition, e.g., 20% duty cycle. The second sensor output may be added to the first sensor pulse to create a 60% duty cycle.

In one example, the method 300 and 400 in cooperation provide a single sensed clutch position as a pulse width modulated non-transitory signal. In this way, the first and the second sensor provide a redundant signal ensuring the integrity of the position of the clutch. By including redundant signals, a range of positions from fully engaged to fully disengaged may be detected, including intermediate ranges between engagement and disengagement.

Figure 5:
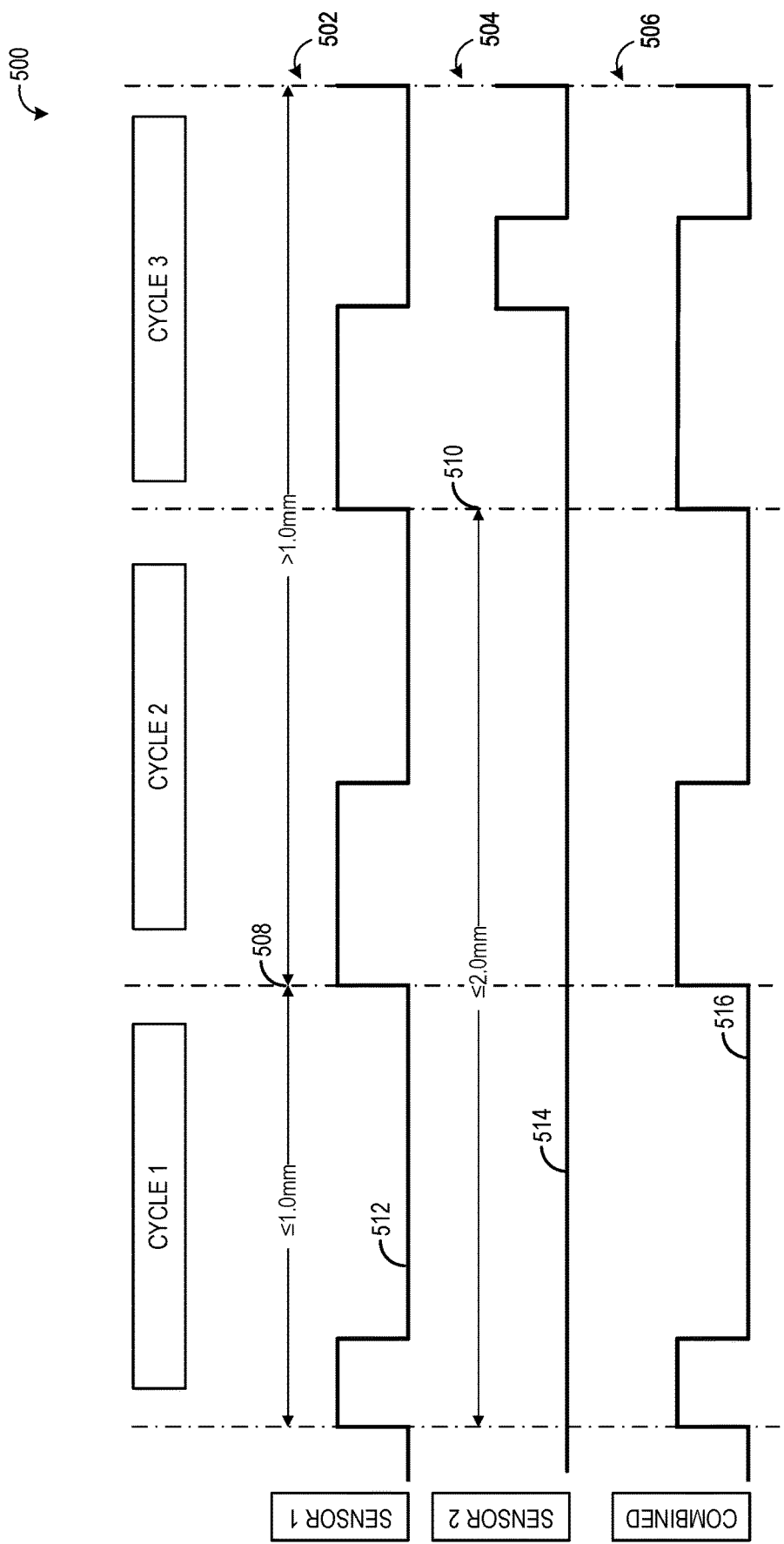
FIG. 5 shows a timing diagram for example prophetic detection of a position of a clutch of a transmission system, according to the method of FIGS. 3-4.

FIG. 5 illustrates a timing diagram 500 for example prophetic detection of a position of a clutch of a manual transmission according to the method of FIG. 3 and FIG. 4. In the example, the position of the clutch is determined based on a combined PWM output of a first sensor, e.g., a master sensor, and a second sensor, e.g., a slave sensor. In the timing diagram 500, three cycles of PWM are shown. In the timing diagram 500, each cycle of PWM illustrates a position of a range of positions for a moveable element, e.g., clutch gear teeth. Plot 502 shows a PWM signal period for the first sensor. Plot 504 shows the PWM signal period for the second sensor. Plot 506 shows the PWM signal period for the combined output of the first and second sensor.

Turning to cycle one of timing diagram 500, plot 502 shows a minimum threshold position 508 for the clutch gear teeth. In the example, the minimum threshold position 508 is 1.0 mm. During cycle one, the first sensor 512 produces a short pulse, e.g., 20% duty cycle, indicating the position of the clutch gear teeth equal to or less than the minimum threshold 508. Plot 504 shows a second threshold position 510 for the clutch gear teeth greater than the minimum threshold 508. In one example, the second threshold position is 2.0 mm. During cycle one, plot 504 shows a second sensor 514 producing no pulse, indicating the second sensor measurement in agreement with the first sensor measurement. Plot 506 shows a combined pulse 516 by the addition of the pulses produced by the first and second sensors. In this example, the combined pulse 516 is short and the first and second sensor outputs agree. In an example, the clutch gear teeth are in an engaged position during the first cycle.

Turning to cycle two of timing diagram 500, plot 502 shows the first sensor pulse 512 producing a medium pulse, e.g., 40% duty cycle, indicating the position of the clutch gear teeth greater than the minimum threshold 508, e.g., more 1.0 mm. During cycle two, plot 504 shows the second sensor 514 producing no pulse, indicating the second sensor measurement in agreement with the first sensor measurement. The position measured by the second sensor during cycle 2 is less than the second threshold 510, e.g., less than 2.0 mm. Plot 506 shows the combined pulse 516 is 40% duty cycle and the determination of the first and second sensors agree. In an example, the clutch gear teeth are in a transitional position between engaged and fully disengaged.

Turning to cycle three of timing diagram 500, plot 502 shows the first sensor 512 producing a pulse of 40% duty cycle, indicating the position of the clutch gear teeth greater than the minimum threshold 508, e.g., more than 1.0 mm. Plot 504 shows the second sensor 514 producing a short pulse, e.g., 20% duty cycle, indicating the second sensor 514 detects the gear teeth position greater than the second threshold 510, e.g., more than 2.0 mm. Plot 506 shows the combined pulse 516 is 60% duty cycle, indicating a position greater than the minimum threshold and greater than the second threshold. In an example, the clutch gear teeth are fully disengaged during cycle three.

The timing diagram 500 depicts scenarios where the first and second sensors agree with respect to the position of the moveable element. In an example, a number of fault detections are possible because master synchronizing and known duty cycle values are fixed. As an example, an output 80% duty cycle may indicate an internal degradation of the first sensor, whereas an output high may indicate may indicate an internal degradation of the second sensor. In another example, if the first sensor produces a shorter signal, e.g., 20% duty cycle, and the second sensor produces a shorter signal, the sensors are in disagreement. In such an example, the first sensor may indicate engagement of the clutch gear teeth whereas the second sensor may indicate disengagement of the clutch gear teeth. In such a case, an output high fault may be generated as indicated by a long pulse. Upon receipt of the fault indication, the controller may make a further adjustment to an actuator of the clutch to resolve the disagreement. In this way, there are multiple sensors measuring the position of the clutch with interconnected outputs performing a number of plausibility checks.

The systems and methods described herein have the technical effect of providing clutch release and engagement feedback, including the detection of transitional engagement. By arranging sensors in parallel, with each detecting a position of a common element, transitional engagement over a range of intermediate positions may be detected. The multi-sensor approach is particularly advantageous in that it can also detect when degradation has occurred. The systems and methods described herein may further have the technical effect of providing clutch release and engagement feedback in a manner that is fault-tolerant.

FIGS. 1-2 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space therebetween and no other components may be referred to as such, in at least one example. As yet another example, elements shown above/below one another, at opposite sides to one another, or to the left/right of one another may be referred to as such, relative to one another. Further, as shown in the figures, a topmost element or point of element may be referred to as a "top" of the component and a bottommost element or point of the element may be referred to as a "bottom" of the component, in at least one example. As used herein, top/bottom, upper/lower, above/below, may be relative to a vertical axis of the figures and used to describe positioning of elements of the figures relative to one another. As such, elements shown above other elements are positioned vertically above the other elements, in one example. As yet another example, shapes of the elements depicted within the figures may be referred to as having those shapes (e.g., such as being circular, straight, planar, curved, rounded, chamfered, angled, or the like). Additionally, elements coaxial with one another may be referred to as such, in one example. Further, elements shown intersecting one another may be referred to as intersecting elements or intersecting one another, in at least one example. Further still, an element shown within another element or shown outside of another element may be referred as such, in one example. In other examples, elements offset from one another may be referred to as such. Elements having a continuous shape may be referred to as such, in on example. Further in another example, elements having a monolithic shape may be referred to as such. As used herein, the terms "substantially" and "approximately" are construed to mean plus or minus five percent or less of the range or value unless otherwise specified.

The disclosure also provides support for a method for sensing a clutch position, comprising: generating a single output signal by combining at least an output of a first sensor and an output of a second sensor output, the first sensor and second sensor connected in parallel, and the first sensor and the second sensor sensing a common moving element of a clutch. In a first example of the method, a first sensor output and a second sensor output are provided on a common sensor bus. In a second example of the method, optionally including the first example, the first sensor output is a master pulse width modulation output and the second sensor output follows a modulation frequency of the first sensor output. In a third example of the method, optionally including one or both of the first and second examples, the method further comprises: the first sensor outputting a low to high transition at the modulation frequency, and the second sensor adding its output at the modulation frequency. In a fourth example of the method, optionally including one or more or each of the first through third examples, the method further comprises: the first sensor outputting a longer pulse in response to detection of internal degradation of the first sensor, the first sensor outputting a shorter pulse in response to position being below a minimum threshold, and the first sensor outputting a medium pulse in response to position being above the minimum threshold. In a fifth example of the method, optionally including one or more or each of the first through fourth examples, the method further comprises: in response to the second sensor detecting the low to high transition of the first sensor, the second sensor sampling the output of the first sensor and the second sensor generating an output based upon measuring the position. In a sixth example of the method, optionally including one or more or each of the first through fifth examples, the method further comprises: in response to the second sensor detecting the low to high transition of the first sensor, the second sensor sampling output of the first sensor and the second sensor generating an output based upon an internal degradation of the second sensor. In a seventh example of the method, optionally including one or more or each of the first through sixth examples, the method further comprises: in response to the second sensor detecting position higher than a second threshold while the first sensor indicates position below the minimum threshold, outputting a high signal continuously. In an eighth example of the method, optionally including one or more or each of the first through seventh examples, the method further comprises: in response to the second sensor detecting position lower than a second threshold while the first sensor indicates position above the minimum threshold, the second sensor not generating an output. In a ninth example of the method, optionally including one or more or each of the first through eighth examples, the method further comprises: in response to the second sensor detecting position great than a second threshold while the first sensor indicates position above the minimum threshold, the second sensor generating a low duty cycle addition to the first sensor output.

The disclosure also provides support for a clutch system, comprising: a clutch, a first sensor coupled to the clutch, a second sensor coupled to the clutch, a control unit receiving a first output of the first sensor and a second output of the second sensor, the control unit further outputting a single sensed clutch position to a control system by combining the first output and the second output. In a first example of the system, the control system includes a microcontroller. In a second example of the system, optionally including the first example, the first sensor and the second sensor sense a common moving element of the clutch. In a third example of the system, optionally including one or both of the first and second examples, the single sensed clutch position is a pulse width modulated non-transitory signal. In a fourth example of the system, optionally including one or more or each of the first through third examples, the first output is a master pulse width modulation output and the second output follows a modulation frequency of the first output. In a fifth example of the system, optionally including one or more or each of the first through fourth examples, the control unit is configured to receives add the second output to the first output upon a low to high transition at the modulation frequency. In a sixth example of the system, optionally including one or more or each of the first through fifth examples, the control system determines degradation of the clutch and generates an indication of the determined degradation.

The disclosure also provides support for a method for sensing a clutch position, comprising: generating a single pulse-width modulated output signal by combining at least a pulse width modulated output of a first sensor and a pulse width modulated output of a second sensor, the first sensor and second sensor connected in parallel, and the first sensor and the second sensor sensing a common moving element of a clutch. In a first example of the method, a first sensor output and a second sensor output are provided on a common sensor bus, and wherein the first sensor output is a master pulse width modulation output and the second sensor output follows a modulation frequency of the first sensor output, the method further comprising the first sensor outputting a low to high transition at the modulation frequency, and the second sensor adding its output at the modulation frequency. In a second example of the method, optionally including the first example, the method further comprises: the first sensor outputting a longer pulse in response to detection of internal degradation of the first sensor, the first sensor outputting a shorter pulse in response to position being below a minimum threshold, and the first sensor outputting a medium pulse in response to position being above the minimum threshold, in response to the second sensor detecting the low to high transition of the first sensor, the second sensor sampling the output of the first sensor and the second sensor generating an output based upon measuring the position, in response to the second sensor detecting the low to high transition of the first sensor, the second sensor sampling output of the first sensor and the second sensor generating an output based upon an internal degradation of the second sensor, and in response to the second sensor detecting position higher than a second threshold while the first sensor indicates position below the minimum threshold, outputting a high signal continuously.

Note that the example control and estimation routines included herein can be used with various vehicle system configurations. The control methods and routines disclosed herein may be stored as executable instructions in non-transitory memory and may be carried out by the control system including the controller in combination with the various sensors, actuators, and other system hardware. The specific routines described herein may represent one or more of any number of processing strategies. As such, various commands, operations, and/or actions described herein may be performed in the sequence illustrated, in tandem, or in some cases omitted. Likewise, the order of processing is provided for ease of description and is not necessarily required to achieve the features and advantages of the examples described herein. One or more of the actions, operations, and/or functions, described herein may be repeatedly performed depending on the particular strategy being used. Further, the described actions, operations, and/or functions may graphically represent code to be programmed into non-transitory memory of the computer readable storage medium in a differential control system, where the described actions are carried out by executing the instructions in a system including the various hardware components in combination with the electronic controller.

It will be appreciated that the configurations and routines disclosed herein are exemplary in nature, and that these specific examples are not to be considered in a limiting sense, because numerous variations are possible. For example, the above technology may be applied to motor systems with different configurations and in a vehicle with a variety of propulsion sources such as motors, engines, combinations thereof, etc. Moreover, the terms "first," "second," "third," and the like are not intended to denote any order, position, quantity, or importance, but rather are used merely as labels to distinguish one element from another, unless explicitly stated to the contrary. The subject matter of the present disclosure includes all novel and non-obvious combinations and sub-combinations of the various systems and configurations, and other functions, features, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither excluding nor requiring two or more such elements. Other combinations and sub-combinations of the disclosed features, functions, elements, and/or properties may be claimed through amendment of the present claims or through presentation of new claims in this or a related application. Such claims, whether narrower, broader, equal, or different in scope to the original claims, also are regarded as included within the subject matter of the present disclosure.

The invention claimed is:

1. A method for sensing a clutch position, comprising: generating a single output signal by combining at least an output of a first sensor and an output of a second sensor, the first sensor and second sensor connected in parallel, and the first sensor and the second sensor sensing a common moving element of a clutch, wherein the output of the first sensor is a master pulse width modulation output and the output of the second sensor follow a modulation frequency of the output of the first sensor.

2. The method of claim 1, wherein the output of the first sensor and the output of the second sensor are provided on a common sensor bus.

3. The method of claim 1, further comprising the first sensor outputting a low to high transition at the modulation frequency, and the second sensor adding its output at the modulation frequency.

4. The method of claim 3, further comprising the first sensor outputting a longer pulse in response to detection of internal degradation of the first sensor, the first sensor outputting a shorter pulse in response to a position of the common moving element of the clutch being below a minimum threshold, and the first sensor outputting a medium pulse in response to the position of the common moving element of the clutch being above the minimum threshold.

5. The method of claim 4, further comprising, in response to the second sensor detecting the low to high transition of the first sensor, the second sensor sampling the output of the first sensor and the second sensor generating the output based upon measuring the position of the common moving element of the clutch.

6. The method of claim 4, further comprising, in response to the second sensor detecting the low to high transition of the first sensor, the second sensor sampling the output of the first sensor and the second sensor generating the output based upon an internal degradation of the second sensor.

7. The method of claim 4, further comprising, in response to the second sensor detecting the position of the common moving element of the clutch higher than a second threshold while the first sensor indicates the position of the common moving element of the clutch below the minimum threshold, outputting a high signal continuously.

8. The method of claim 4, further comprising, in response to the second sensor detecting the position of the common moving element of the clutch lower than a second threshold while the first sensor indicates the position of the common moving element of the clutch above the minimum threshold, the second sensor not generating the output.

9. The method of claim 4, further comprising, in response to the second sensor detecting the position of the common moving element of the clutch great than a second threshold while the first sensor indicates the position of the common moving element of the clutch above the minimum threshold, the second sensor generating a low duty cycle addition to the first sensor output.

10. A clutch system, comprising:
   a clutch;
   a first sensor coupled to the clutch;
   a second sensor coupled to the clutch, wherein the first sensor and second sensor sense a common moving element of the clutch;
   a control unit receiving a first output of the first sensor and a second output of the second sensor, the control unit further outputting a single sensed clutch position to a control system by combining the first output and the second output, and wherein the first output is a master pulse width modulation output and the second output follows a modulation frequency of the first output.

11. The system of claim 10, wherein the control system includes a microcontroller.

12. The system of claim 11, wherein the single sensed clutch position is a pulse width modulated non-transitory signal.

13. The system of claim 12, wherein the control unit is configured to receive and add the second output to the first output upon a low to high transition at the modulation frequency.

14. The system of claim 13, wherein the control system determines degradation of the clutch and generates an indication of the determined degradation.

15. A method for sensing a clutch position, comprising:
   generating a single pulse-width modulated output signal by combining at least a pulse width modulated output of a first sensor and a pulse width modulated output of a second sensor, the first sensor and second sensor connected in parallel, and the first sensor and the second sensor sensing a common moving element of a clutch, wherein the first sensor output and the second sensor output are provided on a common sensor bus, and wherein the first sensor output is a master pulse width modulation output and the second sensor output follows a modulation frequency of the first sensor output, the method further comprising the first sensor outputting a low to high transition at the modulation frequency, and the second sensor adding its output at the modulation frequency.

16. The method of claim 15, further comprising:
   the first sensor outputting a longer pulse in response to detection of internal degradation of the first sensor, the first sensor outputting a shorter pulse in response to the position of the common moving element of the clutch being below a minimum threshold, and the first sensor outputting a medium pulse in response to the position of the common moving element of the clutch being above the minimum threshold;
   in response to the second sensor detecting the low to high transition of the first sensor, the second sensor sampling the output of the first sensor and the second sensor generating an output based upon measuring the position of the common moving element of the clutch;
   in response to the second sensor detecting the low to high transition of the first in response to the second sensor detecting the low to high transition of the first sensor, the second sensor sampling output of the first sensor and the second sensor generating an output based upon an internal degradation of the second sensor; and
   in response to the second sensor detecting position higher than a second threshold while the first sensor indicates the position of the common moving element of the clutch below the minimum threshold, outputting a high signal continuously.

* * * * *